(12) United States Patent
Kumaraiah et al.

(10) Patent No.: US 11,083,005 B2
(45) Date of Patent: Aug. 3, 2021

(54) METHOD FOR REPORTING SCHEDULING DECISIONS BY A COMMUNICATION TESTER

(71) Applicant: Rohde & Schwarz GmbH & Co. KG, Munich (DE)

(72) Inventors: Yadhunandana Kumaraiah, Munich (DE); Francesco Villanese, Munich (DE); Francesco Rossetto, Vaterstetten (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/509,059

(22) Filed: Jul. 11, 2019

(65) Prior Publication Data
US 2021/0014882 A1   Jan. 14, 2021

(51) Int. Cl.
| H04W 72/12 | (2009.01) |
| H04W 24/06 | (2009.01) |
| H04W 72/04 | (2009.01) |
| H04W 88/18 | (2009.01) |
| H04W 88/08 | (2009.01) |

(52) U.S. Cl.
CPC ....... *H04W 72/1289* (2013.01); *H04W 24/06* (2013.01); *H04W 72/0446* (2013.01); *H04W 72/1205* (2013.01); *H04W 88/08* (2013.01); *H04W 88/18* (2013.01)

(58) Field of Classification Search
CPC ............. H04W 72/1289; H04W 24/06; H04W 72/0446; H04W 72/1205
See application file for complete search history.

(56) References Cited

U.S. PATENT DOCUMENTS

| 2003/0204615 | A1* | 10/2003 | Wei | H04L 47/626 709/232 |
| 2004/0192289 | A1* | 9/2004 | Tanaka | H04W 24/00 455/423 |
| 2006/0094416 | A1* | 5/2006 | Endo | H04W 24/06 455/423 |
| 2007/0149186 | A1* | 6/2007 | Barbosa da Torre | H04W 16/18 455/423 |
| 2007/0266289 | A1* | 11/2007 | Yang | H04W 24/06 714/742 |
| 2008/0043619 | A1* | 2/2008 | Sammour | H04L 1/1812 370/231 |
| 2009/0129317 | A1* | 5/2009 | Che | H04L 1/1614 370/328 |
| 2010/0075678 | A1* | 3/2010 | Akman | H04W 24/06 455/436 |

(Continued)

FOREIGN PATENT DOCUMENTS

| WO | 2011127093 A1 | 10/2011 |
| WO | 2017127126 A1 | 7/2017 |

*Primary Examiner* — Jael M Ulysse
(74) *Attorney, Agent, or Firm* — Ditthavong, Steiner & Mlotkowski

(57) ABSTRACT

A method for reporting scheduling decisions by a communication tester is provided. The method comprises the steps of establishing a communication between the communication tester and a device under test, and creating a message log during the communication with the aid of the communication tester. In this context, the message log comprises reports with all negative scheduling decisions.

19 Claims, 3 Drawing Sheets

(56) References Cited

U.S. PATENT DOCUMENTS

| | | | |
|---|---|---|---|
| 2010/0157927 A1* | 6/2010 | Mochizuki | H04L 27/0006 370/329 |
| 2011/0093757 A1* | 4/2011 | Seol | H04L 1/1854 714/749 |
| 2011/0142075 A1* | 6/2011 | Che | H04L 5/0053 370/476 |
| 2012/0051305 A1* | 3/2012 | Wang | H04L 5/0021 370/329 |
| 2012/0088457 A1* | 4/2012 | Johansson | H04W 24/10 455/67.11 |
| 2012/0120894 A1* | 5/2012 | Hohne | H04L 1/1861 370/329 |
| 2012/0147832 A1* | 6/2012 | Kim | H04L 1/1809 370/329 |
| 2012/0157090 A1* | 6/2012 | Kim | H04W 24/08 455/424 |
| 2012/0207030 A1* | 8/2012 | Luong | H04W 24/06 370/245 |
| 2012/0269143 A1* | 10/2012 | Bertrand | H04W 72/1231 370/329 |
| 2013/0083742 A1* | 4/2013 | Baldemair | H04L 1/1861 370/329 |
| 2013/0176920 A1* | 7/2013 | Seo | H04L 1/1861 370/280 |
| 2014/0169319 A1* | 6/2014 | Yang | H04W 72/0413 370/329 |
| 2014/0177459 A1* | 6/2014 | Watt | H04L 41/0806 370/252 |
| 2014/0204912 A1* | 7/2014 | Tanaka | H04L 5/0053 370/335 |
| 2014/0247799 A1* | 9/2014 | Suzuki | H04W 74/0833 370/329 |
| 2015/0003383 A1* | 1/2015 | Wager | H04L 1/1812 370/329 |
| 2015/0023188 A1* | 1/2015 | Das | G01R 31/319 370/252 |
| 2015/0051872 A1* | 2/2015 | Arora | G06F 11/3428 702/186 |
| 2015/0081614 A1* | 3/2015 | Bechet | G06F 11/3692 706/52 |
| 2015/0094113 A1* | 4/2015 | Li | H04W 52/325 455/522 |
| 2015/0156006 A1* | 6/2015 | Takano | H04L 5/0055 370/280 |
| 2015/0181448 A1* | 6/2015 | Otonari | H04L 5/1469 370/252 |
| 2016/0211962 A1* | 7/2016 | Lee | H04L 1/1861 |
| 2016/0226643 A1* | 8/2016 | Mallik | H04L 1/1819 |
| 2016/0359591 A1* | 12/2016 | Yellapantula | H04W 24/06 |
| 2017/0026865 A1* | 1/2017 | Behravan | H04W 24/10 |
| 2017/0099128 A1* | 4/2017 | Gao | H04L 1/1812 |
| 2017/0231028 A1* | 8/2017 | Kim | H04W 52/228 |
| 2017/0353374 A1* | 12/2017 | Shatil | H04L 12/4625 |
| 2017/0367110 A1* | 12/2017 | Li | H04W 72/1268 |
| 2018/0020417 A1* | 1/2018 | Catovic | H04W 4/70 |
| 2018/0139014 A1* | 5/2018 | Xiong | H04L 1/1861 |
| 2018/0146398 A1* | 5/2018 | Kim | H04W 80/02 |
| 2018/0167172 A1* | 6/2018 | Hosseini | H04L 23/00 |
| 2018/0213530 A1* | 7/2018 | Mochizuki | H04W 72/0446 |
| 2019/0215872 A1* | 7/2019 | Park | H04W 74/0833 |
| 2019/0278645 A1* | 9/2019 | Hsu | G06F 11/079 |
| 2019/0312713 A1* | 10/2019 | Yang | H04L 5/0091 |
| 2020/0145144 A1* | 5/2020 | Hosseini | H04L 1/1896 |

* cited by examiner

METHOD FOR REPORTING SCHEDULING DECISIONS BY A COMMUNICATION TESTER

TECHNICAL FIELD

The invention relates to a method for reporting scheduling decisions by a communication tester and a corresponding communication tester for reporting scheduling decisions.

BACKGROUND ART

Generally, in times of an increasing number of applications providing wireless communication capabilities, there is a growing need of a method for reporting scheduling decisions by a communication tester and a corresponding communication tester for reporting scheduling decisions with respect to a device under test comprising such an application in order to verify correct functioning of said applications in a highly accurate and efficient manner. For example we make reference to WO 2017/127126 A1 and WO 2011/127093 A1.

Unfortunately, neither a method for reporting scheduling decisions by a communication tester nor a communication tester for reporting scheduling decisions is known, which especially allows for identifying why the schedule of the respective communication tester does not include as many grants as expected in the desired time interval.

Accordingly, there is a need to provide a method for reporting scheduling decisions by a communication tester and a corresponding communication tester for reporting scheduling decisions, whereby both a high accuracy and a high efficiency are ensured.

SUMMARY OF THE INVENTION

According to a first aspect of the invention, a method for reporting scheduling decisions by a communication tester is provided. The method comprises the steps of establishing a communication between the communication tester and a device under test, and creating a message log during the communication with the aid of the communication tester. In this context, the message log comprises reports with at least one, preferably all, negative scheduling decision(s). Advantageously, for instance, this allows for an accurate, quick and efficient identification of the schedule decisions. Further advantageously, this also allows for a significantly faster turnaround.

According to a first preferred implementation form of the first aspect of the invention, the communication between the communication tester and the device under test comprises or is an uplink/downlink-communication, preferably a slot-based communication, more preferably a slot-based uplink/downlink-communication. Advantageously, for example, efficiency can further be increased.

According to a second preferred implementation form of the first aspect of the invention, the method further comprises the step of configuring the communication tester as a base station with respect to the device under test. Advantageously, for instance, complexity can further be reduced, thereby increasing efficiency.

According to a further preferred implementation form of the first aspect of the invention, the message log comprises at least all exchanged messages which are created or exchanged by the communication tester. Advantageously, for example, accuracy can further be increased.

According to a further preferred implementation form of the first aspect of the invention, the message log comprises all grants, wherein a grant comprises or is the possibility to receive data in downlink by the device under test and to send data in uplink by the device under test. Advantageously, for instance, efficiency can further be increased.

According to a further preferred implementation form of the first aspect of the invention, especially with respect to the negative scheduling decisions, the method further comprises the step of reporting all rejected transmission or reception possibilities for the device under test with the aid of the message log. Advantageously, for example, efficiency can further be increased.

According to a further preferred implementation form of the first aspect of the invention, the message log comprises the respective slot in which each negative scheduling decision was reported. Advantageously, for instance, accuracy can further be increased.

According to a further preferred implementation form of the first aspect of the invention, each negative scheduling decision comprises a reason. Advantageously, for example, errors or problems can be identified in a very accurate and efficient manner.

According to a further preferred implementation form of the first aspect of the invention, the reason comprises at least one of the desired resources, preferably uplink/downlink-resources, are already reserved for another transmission and/or reception, for the case of a half-duplex device under test, the transition time between uplink and downlink is too short, the communication tester has configured measurement gaps in the respective slot, or any combination thereof.

For instance, the scheduler can reject a downlink grant because the time when the downlink data shall be sent has only uplink symbols. Another example is that an uplink grant is rejected because the uplink data is too close to a downlink transmission and the device under test would not have enough time to switch between downlink and uplink.

In this context, the scheduler especially comprises an algorithm which defines a schedule. Furthermore, the respective set of downlink or uplink grants in every slot is especially defined as a schedule. Additionally, the scheduler or the algorithm is especially implemented by the media access control (MAC) layer.

According to a further preferred implementation form of the first aspect of the invention, each negative scheduling decision comprises a reason and a time at which the desired operation was not possible. Advantageously, for instance, accuracy can further be increased.

According to a further preferred implementation form of the first aspect of the invention, the reports are created with a periodicity, preferably a periodicity of every 10 slots. Advantageously, for example, efficiency can further be increased.

According to a further preferred implementation form of the first aspect of the invention, each negative scheduling decision comprises an identifier. Advantageously, for instance, both accuracy and efficiency can be increased.

According to a further preferred implementation form of the first aspect of the invention, the method further comprises the step of configuring the communication tester so that only certain identifiers are visible in the reports. Advantageously, for example, only the desired information is shown, thereby increasing efficiency.

According to a further preferred implementation form of the first aspect of the invention, the method further comprises the step of configuring the communication tester so that all identifiers except for a certain identifier are visible in the reports. Advantageously, for instance, the shown information can be reduced, which leads to an increased efficiency.

According to a second aspect of the invention, a communication tester for reporting scheduling decisions is provided. The communication tester comprises a communicator, and a controller. In this context, the communicator is configured to establish a communication between the communication tester and a device under test. In addition to this, the controller is configured to create a message log during the communication, wherein the message log comprises reports with at least one, preferably all, negative scheduling decision(s). Advantageously, for instance, this allows for an accurate, quick and efficient identification of the schedule decisions. Further advantageously, this also allows for a significantly faster turnaround.

According to a first preferred implementation form of the second aspect of the invention, the communication between the communication tester and the device under test comprises or is an uplink/downlink-communication, preferably a slot-based communication, more preferably a slot-based uplink/downlink-communication. Advantageously, for example, efficiency can further be increased.

According to a second preferred implementation form of the second aspect of the invention, the communicator is configured to configure the communication tester as a base station with respect to the device under test. Advantageously, for instance, complexity can further be reduced, thereby increasing efficiency.

According to a further preferred implementation form of the second aspect of the invention, the message log comprises at least all exchanged messages which are created or exchanged by the communication tester, preferably by the communicator of the communication tester. Advantageously, for example, accuracy can further be increased.

According to a further preferred implementation form of the second aspect of the invention, the message log comprises all grants, wherein a grant comprises or is the possibility to receive data in downlink by the device under test and to send data in uplink by the device under test. Advantageously, for instance, efficiency can further be increased.

According to a further preferred implementation form of the second aspect of the invention, especially with respect to the negative scheduling decisions, the controller is configured to report all rejected transmission or reception possibilities for the device under test with the aid of the message log. Advantageously, for example, efficiency can further be increased.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
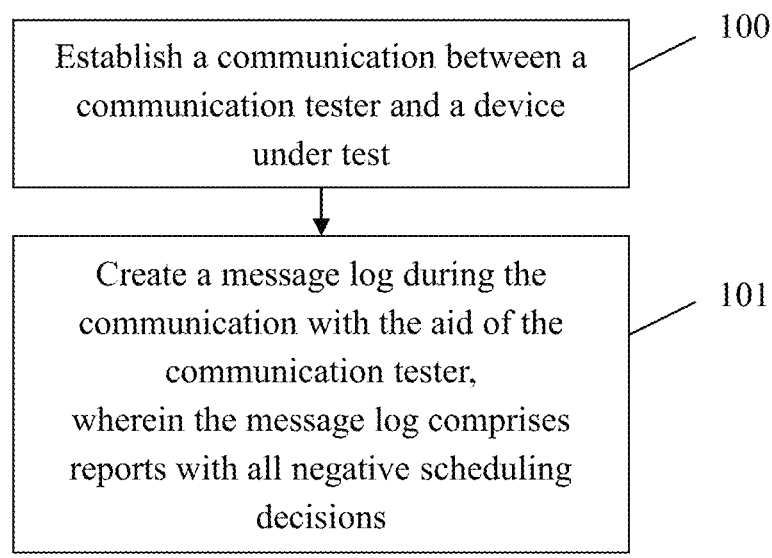
FIG. 1 shows a flow chart of an exemplary embodiment of the first aspect of the invention.

Firstly, FIG. 1 shows a flow chart of an exemplary embodiment of the inventive method for reporting scheduling decisions by a communication tester. In a first step 100, a communication between the communication tester and a device under test is established. Then, in a second step 101, a message log is created during the communication with the aid of the communication tester, wherein the message log comprises reports with all negative scheduling decisions.

In this context, it might be particularly advantageous if the communication between the communication tester and the device under test comprises or is an uplink/downlink-communication, preferably a slot-based communication, more preferably a slot-based uplink/downlink-communication.

Moreover, the method may further comprise the step of configuring the communication tester as a base station with respect to the device under test. With respect to the device under test, it is generally noted that the device under test may especially comprise or be user equipment. It is further noted that it might be particularly advantageous if the message log comprises at least all exchanged messages which are created or exchanged by the communication tester.

In addition to this or as an alternative, the message log may comprise all grants, wherein a grant comprises or is the possibility to receive data in downlink by the device under test and to send data in uplink by the device under test. Especially with respect to the negative scheduling decisions, the method may further comprise the step of reporting all rejected transmission or reception possibilities for the device under test with the aid of the message log.

Further additionally or alternatively, the message log may comprise the respective slot in which each negative scheduling decision was reported. It might be particularly advantageous if each negative scheduling decision comprises a reason.

In this context, the reason may comprise at least one of the desired resources, preferably uplink/downlink-resources, are already reserved for another transmission and/or reception, for the case of a half-duplex device under test, the transition time between uplink and downlink is too short, the communication tester has configured measurement gaps in the respective slot, or any combination thereof.

Further additionally or further alternatively, each negative scheduling decision may comprise a reason and a time at which the desired operation was not possible.

In this context, as already mentioned above, the reason may comprise at least one of the desired resources, preferably uplink/downlink-resources, are already reserved for another transmission and/or reception, for the case of a half-duplex device under test, the transition time between uplink and downlink is too short, the communication tester has configured measurement gaps in the respective slot, or any combination thereof.

With respect to the reports, it is noted that the reports may be created with a periodicity, preferably a periodicity of every 10 slots. Alternatively, the reports may be created with a periodicity of every 15 or every 5 slots. It is further noted that it might be particularly advantageous if each negative scheduling decision comprises an identifier.

In this context, the method may further comprise the step of configuring the communication tester so that only certain identifiers are visible in the reports. Furthermore, the method may comprise the step of configuring the communication tester so that all identifiers except for a certain identifier are visible in the reports.

Figure 2:
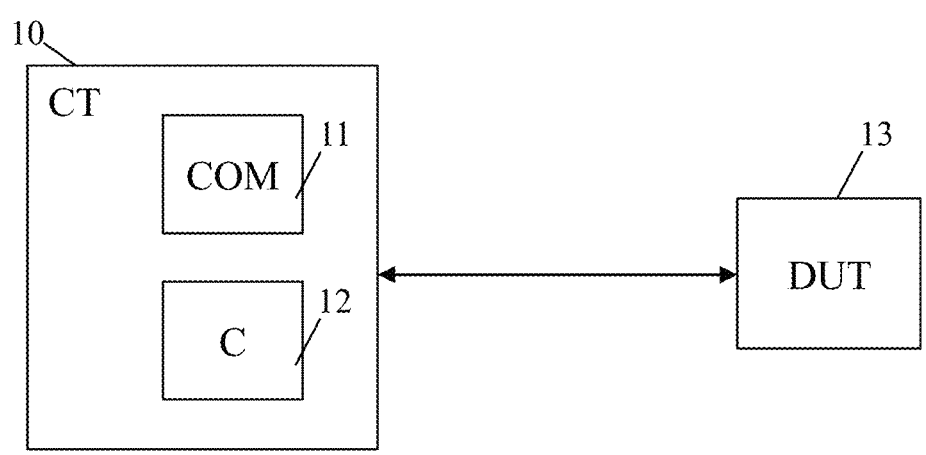
FIG. 2 shows an exemplary embodiment of the second aspect of the invention.

Moreover, FIG. 2 illustrates an exemplary embodiment of the inventive communication tester 10 for reporting scheduling decisions. Said communication tester 10 comprises a communicator 11, and a controller 12.

In this context, the communicator 11 establishes a communication between the communication tester 10 and a device under test 13. In addition to this, the controller 12 creates a message log during the communication, wherein the message log comprises reports with all negative scheduling decisions.

In this context, it is noted that it might be particularly advantageous if the communication between the communication tester 10 and the device under test 13 comprises or is an uplink/downlink-communication, preferably a slot-based communication, more preferably a slot-based uplink/downlink-communication. It is further noted that the communicator 11 may configure the communication tester 10 as a base station with respect to the device under test 13. With respect to the device under test 13, it is noted that the device under test 13 may comprise or be user equipment.

With respect to the message log, it is noted that the message log may comprise at least all exchanged messages which are created or exchanged by the communication tester 10, preferably by the communicator 11 of the communication tester 10. Additionally or alternatively, the message log may comprise all grants, wherein a grant comprises or is the possibility to receive data in downlink by the device under test 13 and to send data in uplink by the device under test 13.

Especially with respect to the negative scheduling decisions, the controller 12 may report all rejected transmission or reception possibilities for the device under test 13 with the aid of the message log. Again, with respect to the message log, the message log may comprise the respective slot in which each negative scheduling decision was reported. It is further noted that it might be particularly advantageous if each negative scheduling decision comprises a reason.

In this context, the reason may comprise at least one of the desired resources, preferably uplink/downlink-resources, are already reserved for another transmission and/or reception, for the case of a half-duplex device under test, the transition time between uplink and downlink is too short, the communication tester has configured measurement gaps in the respective slot, or any combination thereof. Alternatively, each negative scheduling decision may comprise a reason and a time at which the desired operation was not possible.

In this context, as already mentioned above, the reason may comprise at least one of the desired resources, preferably uplink/downlink-resources, are already reserved for another transmission and/or reception, for the case of a half-duplex device under test, the transition time between uplink and downlink is too short, the communication tester has configured measurement gaps in the respective slot, or any combination thereof.

It is further noted that the reports may be created with a periodicity, preferably a periodicity of every 10 slots. Alternatively, the reports may be created with a periodicity of every 15 or every 5 slots especially with the aid of the controller 12 of the communication tester 10. With respect to the negative scheduling decisions, it is noted that each negative scheduling decision may comprise an identifier.

In this context, it might be particularly advantageous if the controller 12 configures the communication tester 10 so that only certain identifiers are visible in the reports. Furthermore, the controller 12 may configure the communication tester 10 so that all identifiers except for a certain identifier are visible in the reports.

Figure 3:
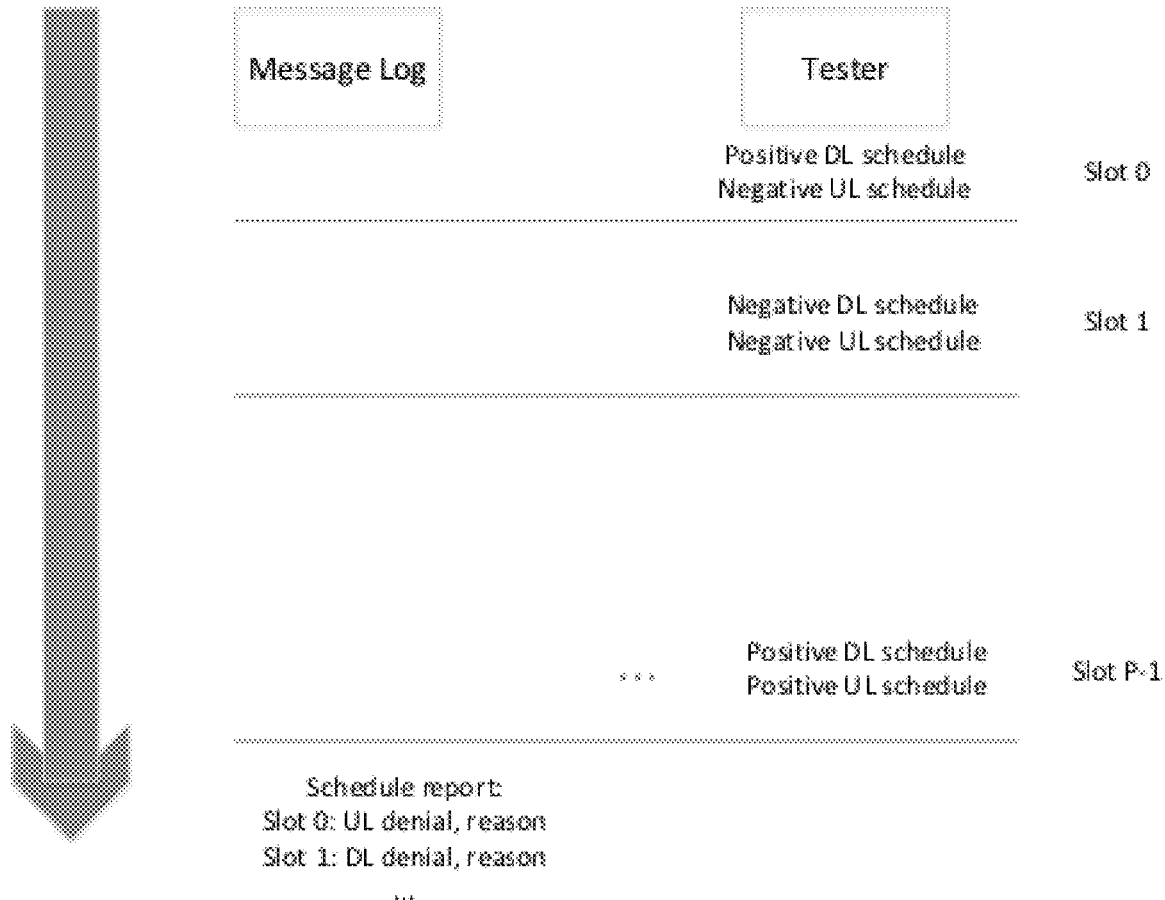
FIG. 3 shows an exemplary message log.

Finally, with respect to FIG. 3, an exemplary message log is illustrated.

As it can be seen from FIG. 3, a first slot (Slot 0) comprises a positive downlink (DL) schedule and a negative uplink (UL) schedule. Additionally, a second slot (Slot 1) comprises negative DL schedule and a negative UL schedule. The exemplary last slot (Slot P−1) comprises a positive DL schedule and a positive UL schedule.

Accordingly, the schedule report of the corresponding message log comprises the first slot and the second slot because of the respective negative schedules and the corresponding reason therefor in each case.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for reporting scheduling decisions by a communication tester, the method comprising the steps of:
   establishing a communication between the communication tester and a device under test, and
   creating a message log during the communication via the communication tester,
   wherein the message log comprises reports with at least one negative scheduling decision,
   wherein the at least one negative scheduling decision comprises a reason and a time at which a desired operation was not possible, and
   wherein the reason comprises a transition time between uplink and downlink that is too short for a half-duplex device under test and/or the communication tester has configured measurement gaps in a respective slot.

2. The method according to claim 1,
   wherein the communication between the communication tester and the device under test is at least one of an uplink/downlink-communication, a slot-based communication, or a slot-based uplink/downlink-communication.

3. The method according to claim 1,
   wherein the method further comprises the step of configuring the communication tester as a base station with respect to the device under test.

4. The method according to claim 1,
   wherein the message log comprises at least all exchanged messages which are created or exchanged by the communication tester.

5. The method according to claim 1,
   wherein the message log comprises all grants, wherein a grant is a possibility to receive data in downlink by the device under test and to send data in uplink by the device under test.

6. The method according to claim 1,
   wherein the negative scheduling decisions further comprise the step of reporting all rejected transmission or possibilities of reception for the device under test based on the message log.

7. The method according to claim 1,
wherein the message log comprises a respective slot in which each negative scheduling decision was reported and/or wherein the message log comprises reports with all negative scheduling decisions.

8. The method according to claim 1,
wherein each negative scheduling decision comprises a reason.

9. The method according to claim 8,
wherein the reason comprises at least one of lack of resources, lack of uplink/downlink-resources, resources already reserved for another transmission or reception, transition time between uplink and downlink is too short for a half-duplex device under test, the communication tester has configured measurement gaps in the respective slot, or any combination thereof.

10. The method according to claim 1,
wherein the reports are created periodically or with a periodicity of every 10 slots.

11. The method according to claim 1,
wherein each negative scheduling decision comprises an identifier.

12. The method according to claim 11,
wherein the method further comprises the step of configuring the communication tester so that only certain identifiers are visible in the reports.

13. The method according to claim 11,
wherein the method further comprises the step of configuring the communication tester so that all identifiers except for a certain identifier are visible in the reports.

14. A communication tester for reporting scheduling decisions, the communication tester comprising:
a transceiver, and
a controller,
wherein the transceiver establishes a communication between the communication tester and a device under test,
wherein the controller creates a message log during the communication, wherein the message log comprises reports with at least one negative scheduling decision,
wherein the at least one negative scheduling decision comprises a reason and a time at which a desired operation was not possible, and
wherein the reason comprises a transition time between uplink and downlink that is too short for a half-duplex device under test and/or the communication tester has configured measurement gaps in a respective slot.

15. The communication tester according to claim 14,
wherein the communication between the communication tester and the device under test is at least one of an uplink/downlink-communication, a slot-based communication, or a slot-based uplink/downlink-communication.

16. The communication tester according to claim 14,
wherein the transceiver configures the communication tester as a base station with respect to the device under test.

17. The communication tester according to claim 14,
wherein the message log comprises at least one of all exchanged messages which are created and performed by the transceiver of the communication tester or reports with all negative scheduling decisions.

18. The communication tester according to claim 14,
wherein the message log comprises all grants, wherein a grant is a possibility to receive data in downlink by the device under test and to send data in uplink by the device under test.

19. The communication tester according to claim 14,
wherein the negative scheduling decisions further comprise the controller reporting all rejected transmission or possibilities of reception for the device under test based on the message log.

* * * * *